United States Patent [19]
Tompkins

[11] 3,951,370
[45] Apr. 20, 1976

[54] LEVELING DEVICE

[75] Inventor: E. Allen Tompkins, Helena, Mont.

[73] Assignee: The Raymond Lee Organization, Inc., a part interest

[22] Filed: Sept. 3, 1974

[21] Appl. No.: 502,563

[52] U.S. Cl. .............................. 248/188.3; 16/18 R
[51] Int. Cl.² .................................... F16M 11/20
[58] Field of Search ................ 248/188.3, 188.2; 16/34, 18 R, 18 A, 31 R, 20; 280/11.27, 11.19, 87.04 A

[56] References Cited
UNITED STATES PATENTS

| 30,505 | 10/1860 | Stafford | 16/18 R |
| 93,110 | 7/1869 | Morris | 280/11.27 |
| 151,768 | 6/1874 | Fenton | 280/11.27 |
| 282,099 | 7/1883 | McDonald | 16/34 |
| 2,371,460 | 3/1945 | Needham | 248/188.2 |
| 2,560,562 | 7/1951 | Ferwerda | 16/18 R |
| 3,396,927 | 8/1968 | Masters | 248/188.2 |
| 3,534,978 | 10/1970 | Stanfield | 248/188.2 |
| 3,750,989 | 8/1973 | Bergeson | 248/188.2 |

Primary Examiner—Roy D. Frazier
Assistant Examiner—Darrell Marquette

[57] ABSTRACT

Roller means are attached to a frame which is attached to the bottom of an appliance. The roller means allows the bottom of the appliance to be tilted in a vertical plane. A pivot disposed in the frame allows the bottom of the appliance to be tilted in a second vertical plane perpendicular to the first one.

3 Claims, 5 Drawing Figures

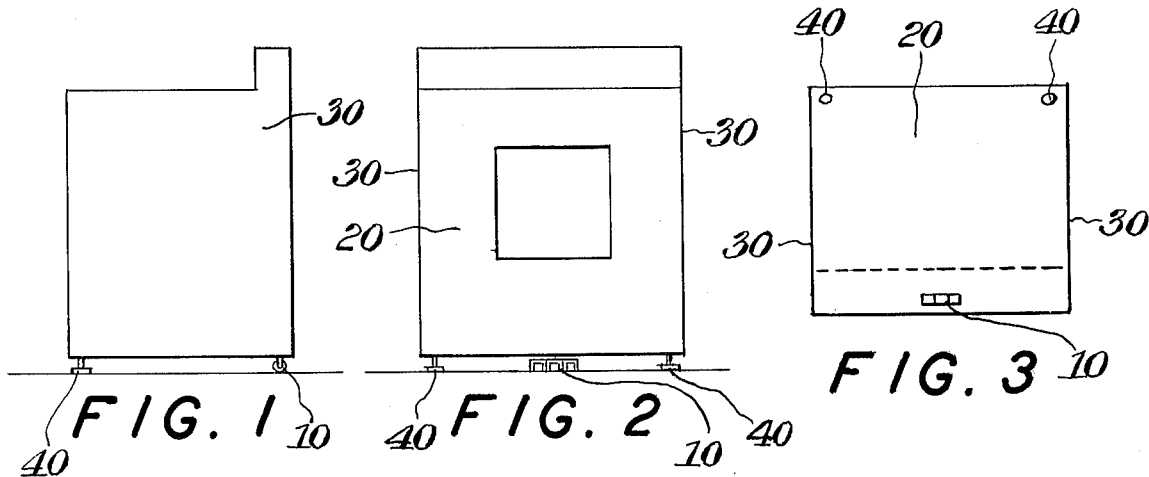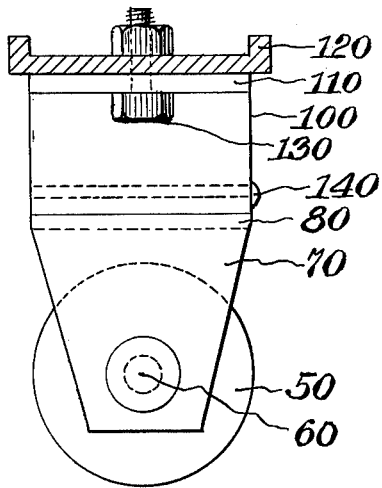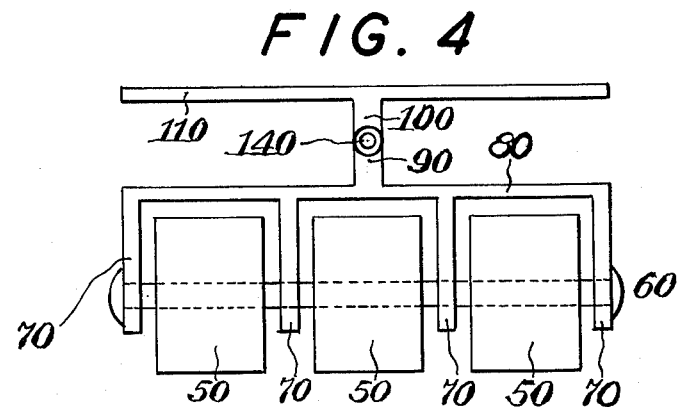

LEVELING DEVICE

SUMMARY OF THE INVENTION

The invention is directed towards a device which can be used to level appliances such as washing machines and dryers.

Thus, roller means are attached to a frame, which is itself attached to the bottom of the appliance to be leveled, at a point along the rear edge midway between the sides of the appliance. The roller means allows the bottom of the appliance to be pivoted in a vertical plane about the axis of the roller means.

A pivot disposed in the frame allows the bottom of the appliance to be pivoted about the axis of the pivot, which is so disposed that a rotation about its axis is also a rotation in a vertical plane perpendicular to the plane of rotation determined by the roller means. Thus, when a conventional leveling leg is disposed at each front corner of the appliance, the appliance can be leveled without reaching in the back of the appliance, by varying the length of each of the leveling legs.

BRIEF DESCRIPTION OF THE DRAWINGS

In the drawings:

FIG. 1 is a side view of the invention in use;
FIG. 2 is a front view of the invention in use;
FIG. 3 is a bottom view of an appliance with the invention mounted;
FIG. 4 is a front view of the invention; and
FIG. 5 is a side view of the invention.

DETAILED DESCRIPTION OF PREFERRED EMBODIMENTS

Referring now to FIGS. 1 through 3, the invention 10 is placed on the bottom of an appliance 20 to be leveled, at a point midway between the sides 30 of the device near the rear edge. Two like conventional leveling legs 40 whose length is variable to enable the appliance to be leveled on a non-level floor are disposed at the two front corners of the bottom of the appliance. Referring now to FIGS. 4 and 5, three like cylindrical nylon rollers 50 are all mounted on a common solid axle 60 that is divided into three equal portions by four like parallel trapezoidal plates 70 that hang down from a support plate 80. A flange 90 extends upwardly from the support plate to a pivot. The pivot connects flange 90 to like flange 100, which extends downwardly from a metal mounting plate 110 which is bolted to the bottom frame 120 of the appliance by bolts 130 extending through holes in the frame and plate 110. The pivot takes the form of a shaft 140 extending through holes in flanges 90 and 100.

When the appliance needs to be leveled from side to side, the pivot allows the flanges to tilt with respect to each other by adjusting the lengths of the leveling legs relative to each other. When the appliance needs to be leveled from front to rear, the roller axle allows the appliance to be tilted about the axis of the axle, by changing the lengths of the legs simultaneously. The shaft 140 is always kept perpendicular to the axle.

While three rollers have been shown in the drawings, the actual number of rollers employed can vary from this figure since the number of rollers used does not affect the principle of the device.

While the invention has been described with detailed reference to the drawings, the protection sought is to be limited only by the terms of the claims which follow.

I claim:

1. A device used in combination with an appliance having a rectangularly shaped bottom surface with opposite sides and front and rear edges to level the appliance on a non-level floor, said device comprising:
   a first flat plate secured to the bottom surface intermediate the sides and adjacent the rear edge;
   first and second leveling legs of variable length, each leg being secured to a corresponding one of the two front corners of the bottom surface;
   a second flat plate spaced below the first plate and generally parallel thereto;
   a first vertical flange secured to the bottom of the first plate and extending downward therefrom;
   a second vertical flange secured to the top of the second plate and extending upward therefrom;
   pivot means interconnecting the bottom of the first flange and the top of the second flange, said pivot means including a first horizontal shaft and allowing the bottom surface of the appliance to be pivoted about the first shaft as an axis;
   a second horizontal shaft disposed below the second plate and extending at right angles to the first shaft;
   support means secured to said second plate and holding the second shaft in position; and
   cylindrical roller means having a horizontal axial bore through which said second shaft extends as an axle, said roller means permitting the bottom surface of the appliance to be pivoted about the second shaft whereby the appliance can be leveled without reaching in the back of the appliance.

2. The device of claim 1 wherein said support means includes a plurality of spaced vertical plates secured to the bottom of the second plate and extending downwards, the vertical plates having horizontally aligned holes through which the second shaft extends.

3. The device of claim 2 wherein the roller means includes a plurality of like cylindrical rollers having horizontal axial bores which are aligned, each roller being separated from each adjacent roller by one of the vertical plates.

* * * * *